US007890587B1

(12) United States Patent
Chebiyyam

(10) Patent No.: US 7,890,587 B1
(45) Date of Patent: Feb. 15, 2011

(54) SYSTEM, METHOD AND COMPUTER PROGRAM PRODUCT FOR CORRECTING A DATE/TIME ASSOCIATED WITH AN ELECTRONIC MAIL MESSAGE

(75) Inventor: Gopi Krishna Chebiyyam, Andhra Pradesh (IN)

(73) Assignee: McAfee, Inc., Santa Clara, CA (US)

( * ) Notice: Subject to any disclaimer, the term of this patent is extended or adjusted under 35 U.S.C. 154(b) by 1126 days.

(21) Appl. No.: 11/349,479

(22) Filed: Feb. 6, 2006

(51) Int. Cl.
*G06F 15/16* (2006.01)
(52) U.S. Cl. ........................................ 709/206; 709/208
(58) Field of Classification Search ................. 709/206, 709/208
See application file for complete search history.

(56) References Cited

U.S. PATENT DOCUMENTS

| 5,941,915 | A | 8/1999 | Federle et al. ................. 701/1 |
| 7,023,816 | B2 * | 4/2006 | Couillard .................... 370/324 |
| 7,313,615 | B2 * | 12/2007 | Fitzpatrick et al. .......... 709/223 |
| 2003/0233421 | A1 * | 12/2003 | Shibata et al. .............. 709/206 |
| 2004/0003255 | A1 * | 1/2004 | Apvrille et al. ............. 713/178 |
| 2004/0088433 | A1 | 5/2004 | Kaler et al. ................. 709/246 |

* cited by examiner

*Primary Examiner*—George C Neurauter, Jr.
*Assistant Examiner*—Mark D Fearer
(74) *Attorney, Agent, or Firm*—Zilka-Kotab, PC

(57) ABSTRACT

A system, method and computer program product are provided. In use, an electronic mail message is identified such that at least one of a date and a time associated with the electronic mail message may be corrected.

20 Claims, 5 Drawing Sheets

SYSTEM, METHOD AND COMPUTER PROGRAM PRODUCT FOR CORRECTING A DATE/TIME ASSOCIATED WITH AN ELECTRONIC MAIL MESSAGE

FIELD OF THE INVENTION

The present invention relates to electronic mail, and more particularly to tracking a date/time associated with an electronic mail.

BACKGROUND

Electronic mail (e.g. "e-mail," etc.) is typically received with various information stored in a header thereof. Such information may include, but is not limited to a name, e-mail address, date, time stamp, etc. For a variety of reasons, unfortunately, such time stamp may be incorrect.

For example, the sent time may be spoofed to a desired time by a sending e-mail server. Further, the date selected by the sending e-mail server may be backdated or postdated due to one reason or another. Still yet, the date and/or time may be changed accidentally by the sending e-mail server.

Even if both send and received time stamps are present in a mail header, they may be misleading. For instance, when such time stamps are different (e.g. one says sent on the 20th of January and the other says received on the 22nd of January, etc.), the sender may argue that the recipient spoofed the received time. It is also possible that the recipient may spoof the "sent time" as well just by taking the SMTP protocol support, etc. Similarly, in this case, the recipient may argue that the sender spoofed the sent time.

Whatever the reason, when a recipient reviews an e-mail, they will see an incorrect sent time, date, etc. which gives rise to various potential problems. Just by way of example, in the context of governmental organizations [e.g. internal revenue service (IRS), federal bureau of investigation (FBI), internal security, police, department of justice, etc.], law firms, financial consulting firms, etc., the sending time/date and/or receiving time/date of an e-mail is very significant. With present systems, a sender can send an e-mail with a wrong time stamp and claim that they sent such e-mail on-time, ahead-of-time, etc. In such situations, it may be difficult for the recipient organization to explain that they did not receive such e-mail on-time.

There is thus a need for overcoming these and/or other problems associated with the prior art.

SUMMARY

A system, method and computer program product are provided. In use, an electronic mail message is identified such that at least one of a date and a time associated with the electronic mail message may be corrected.

DETAILED DESCRIPTION

Figure 1:
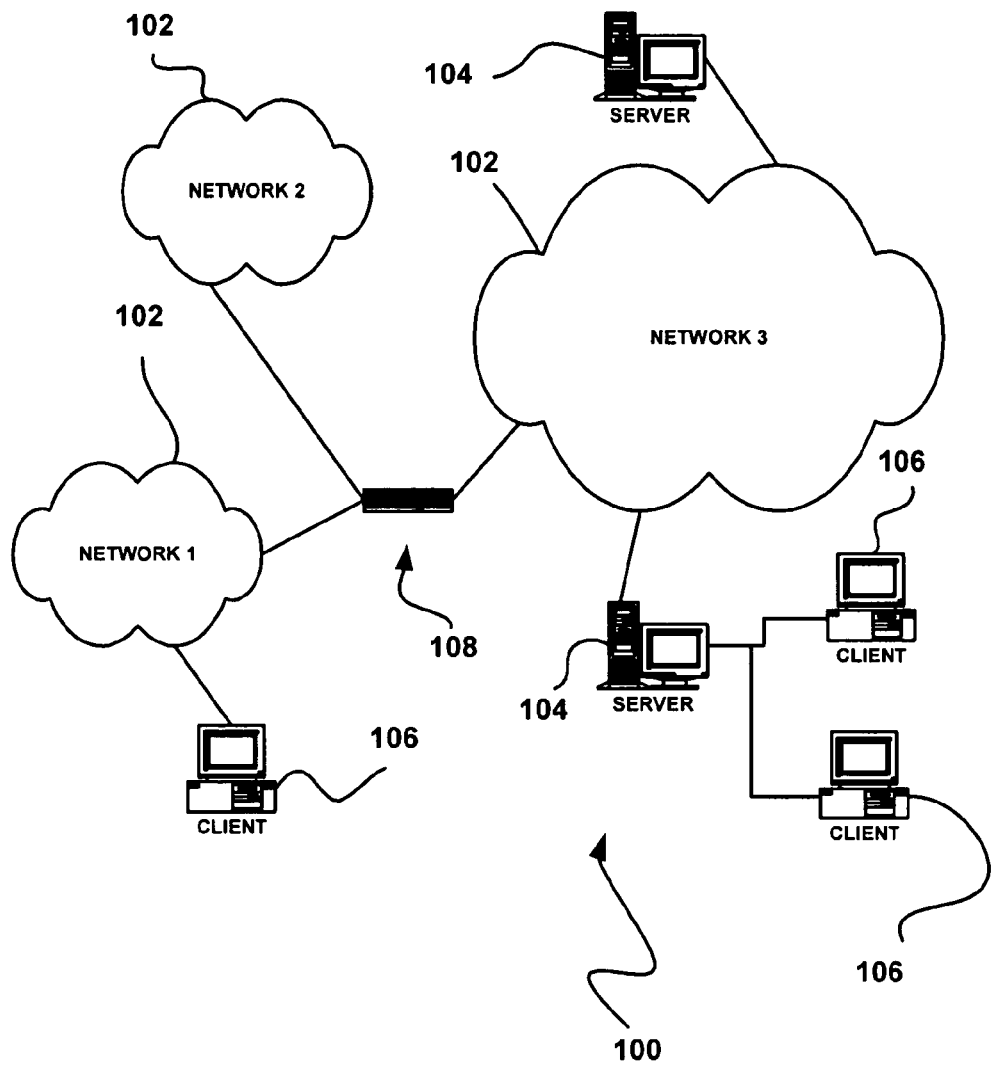
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a mail server, desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
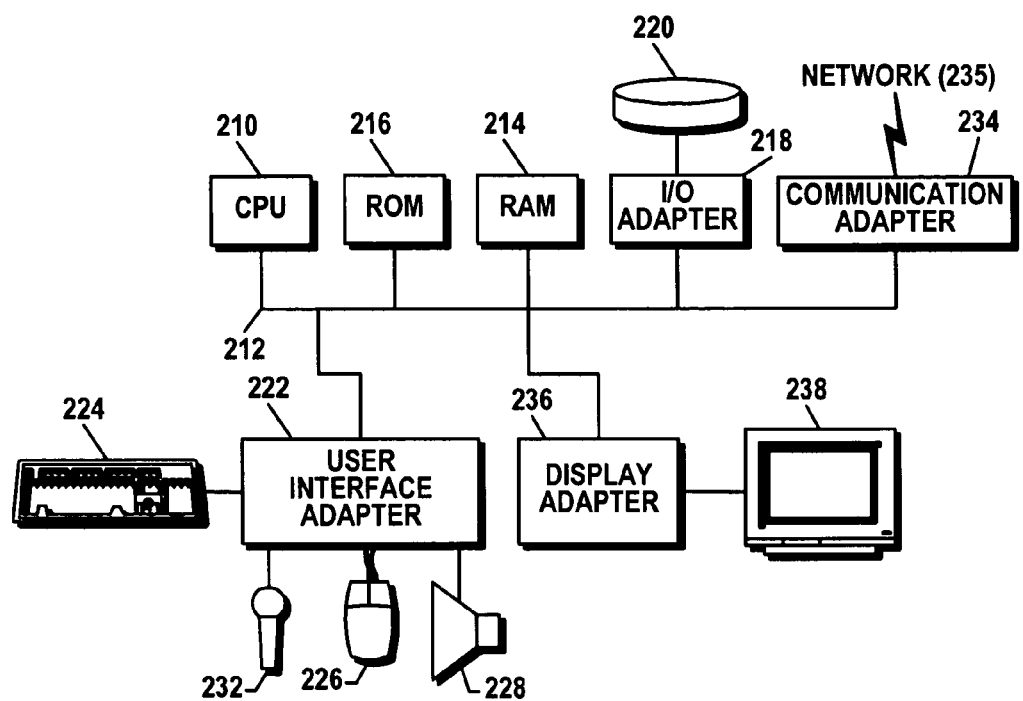
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
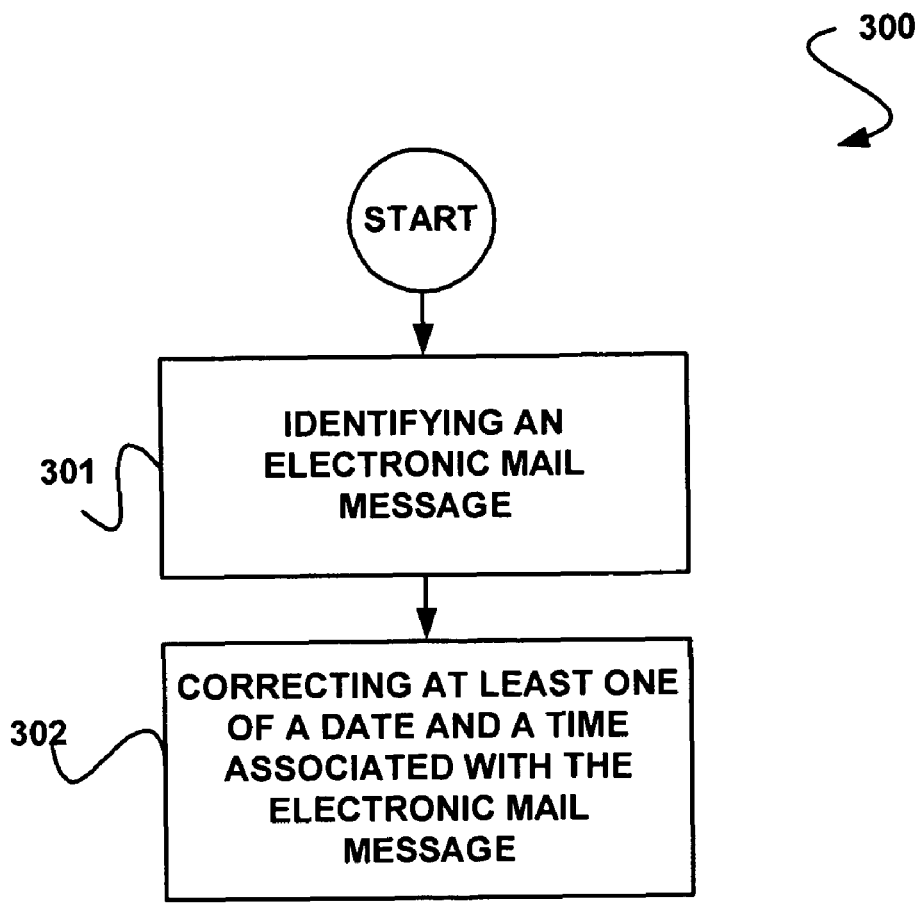
FIG. 3 shows a method for correcting a date and/or time associated with an electronic mail message, in accordance with one embodiment.

FIG. 3 shows a method 300 for correcting a date and/or time associated with an electronic mail message, in accordance with one embodiment. As an option, the method 300 may be implemented in the context of the architecture and environment of FIG. 1 and/or 2. Of course, however, the method 300 may be carried out in any desired environment.

As shown, an electronic mail message is identified. Note operation 301. In the context of the present description, such electronic mail message may include any message that is capable of being electronically communicated. Just by way of example, such electronic mail message may be sent utilizing the simple mail transfer protocol (SMTP), and may be received utilizing the POP3 protocol. Still yet, in other embodiments, the electronic mail message may be generated and received utilizing an electronic mail message manager (e.g. MICROSOFT OUTLOOK, etc.) including composing, reading, and sending capabilities. Of course, other protocols are contemplated including, but not limited to ESMTP, X.400, instant messaging protocols, etc.

Of course, the electronic mail message may be identified in any desired manner. For example, the electronic mail message may be identified upon being sent, upon being received, and/or in transit between a sending server, receiving server, and/or intermediate/relay server.

Thus, in operation 302, at least one of a date and a time (i.e. a date and/or a time, etc.) associated with the electronic mail message may be corrected. Such date and/or time may be corrected by a mail server that sent the electronic mail message, a mail server that received the electronic mail message, a relay mail server, an Internet service provider (ISP), and/or a computer that communicates the electronic mail message between the sending mail server and the receiving mail server. Of course, such date and/or time may be corrected by any computer or component thereof that is capable of such correction.

Still yet, the correction may be carried out in any desired manner. For example, in various optional embodiments, an incorrect date and/or time may simply be replaced with a correct date and/or time. Still yet, an incorrect date and/or time may be supplemented with a correct date and/or time. Even still, one or more notifications may be issued to provide notice of a need for such correction, so as to prompt a user to manually correct such data and/or time, or take other action that results in such correction.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
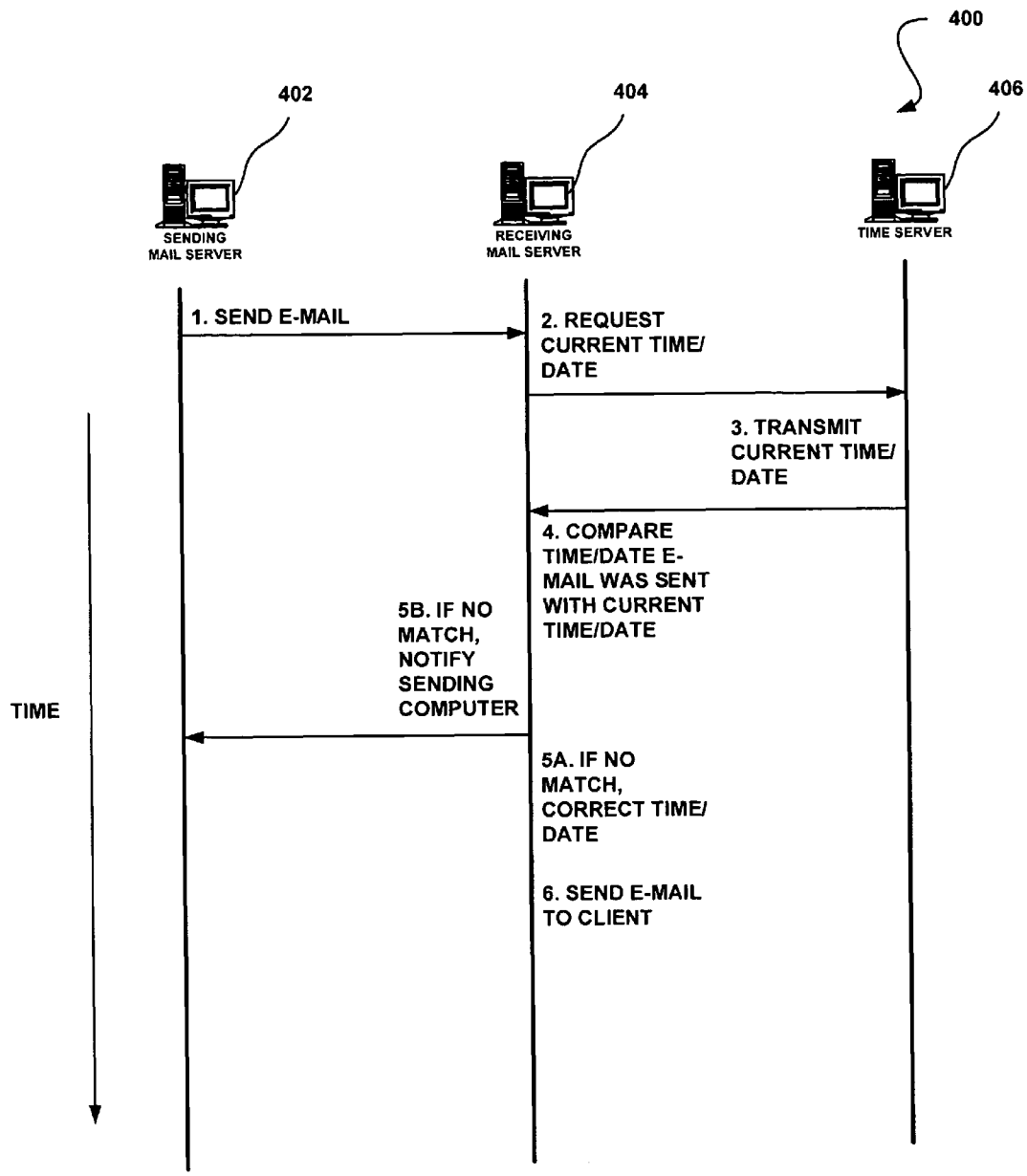
FIG. 4 shows a method for correcting a date and/or time associated with an electronic mail message utilizing a time server, in accordance with another embodiment.

FIG. 4 shows a method 400 for correcting a date and/or time associated with an electronic mail message utilizing a time server, in accordance with another embodiment. As an option, the method 400 may be carried out in the context of the architecture and environment of FIGS. 1-3. Of course, however, the method 400 may be used in any desired environment. Further, the aforementioned definitions may equally apply to the description below.

As shown, the method 400 may be carried out utilizing a system involving multiple components. For example, included is a sending mail server 402 capable of sending an electronic mail message either directly and/or via a client (e.g. a computer equipped with a mail manager and/or access thereto, etc.).

Further provided is a receiving mail server 404 in communication with the sending mail server 402 via one or more networks (e.g. see, for example, the networks 102 of FIG. 1, etc.) for receiving the electronic mail message from the sending mail server 402. While not shown, one or more relay servers (or none) may be coupled between the sending mail server 402 and the receiving mail server 404 via one or more networks for communicating the electronic mail message therebetween.

Still yet, a time server 406 is in communication with the receiving mail server 404 via one or more networks (e.g. see, for example, the networks 102 of FIG. 1, etc.). While not shown, such time server 406 may optionally be in communication with the sending mail server 402 for reasons that will soon become apparent.

In another optional embodiment, the time server 406 may optionally communicate with the aforementioned relay server(s) as well. It is thus technically possible that such time server may be co-located (i.e. available on the same system, computer, machine, etc.) with either the sending mail server, receiving mail server, and/or relay server. Such time server may also be referred to, in some optional embodiments, as a "Reference Time Server" and its time may be called a "Reference Time."

In other embodiments, such time server 406 is capable of generating a current date and/or time in any desired manner. For example, the time server 406 may employ an atomic clock or the like. One example of such time server 406 may include WWW.WORLDTIMESERVER.COM. In use, the time server 406 is capable of transmitting at least one of a current date and a current time, in response to a request therefor.

With continuing reference to FIG. 4, use begins in operation 1, by the electronic mail message being sent between the sending mail server 402 and the receiving mail server 404. In response to such receipt, the receiving mail server 404 requests a current date and/or time from the time server 406. See operation 2.

In response to such request, the current date and/or time is transmitted from the time server 406 to the receiving mail server 404. Note operation 3. Of course, the query of operation 2, and the delivery of the current date and/or time of operation 3 may be carried out in any desired manner that results in the receiving mail server 404 having at its disposal, the actual, correct current date and/or time.

For example, to accommodate the fact that the various servers may be located in different time zones, each server may track a time zone thereof, and further be capable of converting a default time (e.g. GMT, etc.) from the time server 406 to reflect the appropriate time zone. Still yet, in other embodiments, each server may track a time zone thereof, and query the time server 406 in such a way that the appropriate time zone-specific time is retrieved, thus obviating the need for any conversion by the requesting server.

In various other embodiments, the request for the current time in operation 2 need not necessarily be made in association with each received electronic mail message. For example, a separate clock may be maintained and utilized at the receiving mail server 404. Further, such local clock may be checked and, if necessary, corrected/updated either on a manual and/or automated periodic basis. To this end, operations 2-3 may be carried out utilizing the local clock, in order to obtain the current date and/or time. In such embodiments, the sending and/or receiving mail servers may be maintained synchronized with the time server 406. It is also possible that the time server 406 is capable of detecting that the time on the sending/receiving mail server is out of sync, and can either correct the time or make that sending/receiving server correct it. This ensures that, even if the time on the sending/receiving/relay server is hacked (not the timestamp on the e-mail message), it is still detected by the time server 406 and is corrected and/or concerned people are notified of the same.

Armed with the current date and/or time, the receiving mail server 404 is capable of comparing the current date and/or time with the date and/or time associated with the electronic mail message. See operation 4. To this end, correction of the data and/or time associated with the electronic mail message may be performed, based on the comparison.

Specifically, if the current date and/or time does not differ from the date and/or time associated with the electronic mail message by a predetermined amount, no correction need necessarily be performed. In such situation, it may be thus assumed that the date and/or time associated with the electronic mail message is at least substantially correct. To this end, operation may proceed with the sending of the electronic mail message (or at least providing access thereto), with the original date and/or time to the user. See operation 6.

Of course, in a precise embodiment, the aforementioned predetermined amount may be nil or less than one minute. In other embodiments, such predetermined amount may be a predetermined number of minutes. Further, in still other embodiments, such predetermined amount may be user-configurable. More information regarding an exemplary graphical user interface for facilitating such configurability will be set forth in greater detail during reference to FIG. 5.

On the other hand, if the current date and/or time does indeed differ from the date and/or time associated with the electronic mail message by a predetermined amount, the date and/or time associated with the electronic mail message may be changed to reflect the current date and/or time. See operation 5A. Still yet, instead of or in addition to operation 5A, a notification of the correction (or the need thereof) may be provided, as set forth in operation 5B, before and/or in conjunction with sending the electronic mail message in operation 6. It is even possible that such electronic mail message is rejected. In addition, such an anomalous timestamp, and the other details of such an electronic mail message may be logged, which can later be presented/included in the reports. This may ensure that an electronic mail message with an incorrect time stamp will not reach the recipient. Also, informing the sending server that its time is incorrect allows such server to correct its time, thereby its future e-mails will not go out with an incorrect stamp. In one embodiment, the same problem and solution may be applied in the case where the receiving mail server has an incorrect date and time as well.

In various embodiments, the notification may be sent in the form of a separate electronic mail message. Still yet, as an option, the receiving mail server 404 may provide a mechanism for preventing further messages with incorrect dates and/or times from being received. For example, the receiving mail server 404 may optionally black list the sending mail server 402 either immediately upon receipt of one instance of an incorrect date and/or time, or after a predetermined number of such instances (e.g. again, this may be user-configurable, etc.). Of course, such black list may be lifted manually and/or automatically upon the receipt of an electronic mail message with a correct date and/or time, or some other remedy.

In another embodiment, the various operations set forth hereinabove may be altered to accommodate the correction of a date and/or time associated with electronic mail messages sent from the receiving mail server 404. In such embodiment, operation 5B, may, for example, be used to notify the user of the receiving mail server 404 regarding the incorrect date and/or time.

Thus, during use, the receiving mail server 404 may contact the time server 406 to obtain the current time (e.g. GMT, etc.) and then validate a time stamp found in an incoming electronic mail message with that from the time server 406. If it finds a difference (which is configurable, etc.), the receiving mail server 404 may either reject the electronic mail message, citing the reason to be an "invalid time," and/or correct the time stamp in such electronic mail message (again, these actions may be configurable). This ensures that an electronic mail message with an incorrect time stamp does not necessarily reach the recipient. Also, by informing the sending mail server 402 that the time/date is incorrect, the sending mail server 402 server may be allowed to correct its time/date, such that any future electronic mail message is sent with a correct stamp.

Figure 5:
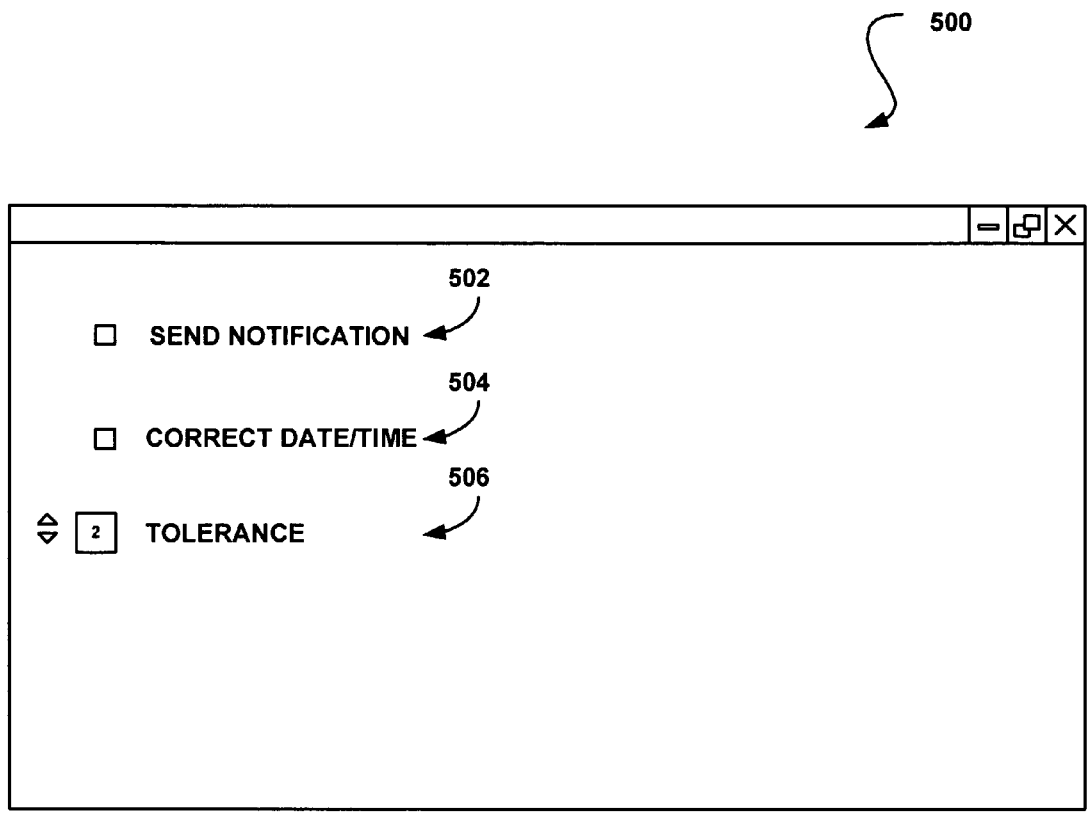
FIG. 5 shows a graphical user interface for allowing a user to select a response to a situation where an incorrect date and/or time is detected, in accordance with another embodiment.

FIG. 5 shows a graphical user interface 500 for allowing a user to select a response to a situation where an incorrect date and/or time is detected, in accordance with another embodiment. As an option, the graphical user interface 500 may be carried out in the context of the architecture and environment of FIGS. 1-4. Of course, however, the graphical user interface 500 may be used in any desired environment. Further, the aforementioned definitions may equally apply to the description below.

As shown, the graphical user interface 500 includes a send notification icon 502 for allowing a user to enable functionality that sends a notification upon the detection of an incorrect date and/or time. See, for example, operation 5B of FIG. 4, etc.

Still yet, the graphical user interface 500 includes a correct date and/or time icon 504 for allowing a user to enable functionality that automatically corrects a date and/or time upon the detection of an incorrect date and/or time. See, for example, operation 5A of FIG. 4, etc.

With continuing reference to FIG. 5, the graphical user interface 500 further includes a tolerance selector 506 for allowing a user to select the degree to which a detected date and/or time must differ with respect to a correct date and/or time before the functionality associated with the send notification icon 502 and/or correct date and/or time icon 504, when enabled, is initiated.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems.

Thus, by optionally incorporating the present technology into the cyber-frameworks of the foregoing potential targets, terrorism may be countered by preventing hackers and/or malware, spyware, etc. from autonomously altering a date and/or time associated with incoming and/or outgoing mail in an unauthorized manner, which may potentially cause extreme financial harm, particularly in a governmental context.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying an electronic mail message; and
correcting at least one of a date and a time associated with the electronic mail message;
wherein at least one of a current date and a current time is compared with the at least one of the date and the time associated with the electronic mail message;
wherein the correction of the at least one of the date and the time associated with the electronic mail message is performed based on the comparison;
wherein the correction is performed if the at least one of the current date and the current time differs from the at least one of the date and the time associated with the electronic mail message a predetermined amount, where the correction includes changing the at least one of the date and the time associated with the electronic mail message to the at least one of the current date and the current time.

2. The method of claim 1, wherein the electronic mail message is generated and received utilizing an electronic mail message manager including composing, reading, and sending capabilities.

3. The method of claim 1, wherein the electronic mail message is a received electronic mail message.

4. The method of claim 1, wherein the electronic mail message is a sent electronic mail message.

5. The method of claim 1, wherein the date associated with the electronic mail message is corrected.

6. The method of claim 1, wherein the time associated with the electronic mail message is corrected.

7. The method of claim 1, wherein the date and the time associated with the electronic mail message are corrected.

8. The method of claim 1, wherein the at least one of the date and the time associated with the electronic mail message is corrected by a mail server that sent the electronic mail message.

9. The method of claim 1, wherein the at least one of the date and the time associated with the electronic mail message is corrected by a mail server that received the electronic mail message.

10. The method of claim 1, wherein the at least one of the date and the time associated with the electronic mail message is corrected by a relay mail server that communicates the electronic mail message between a sending mail server and a receiving mail server.

11. The method of claim 1, wherein the at least one of the date and the time associated with the electronic mail message is corrected utilizing a time server.

12. The method of claim 11, wherein the time server is capable of transmitting at least one of a current date and a current time, in response to a request therefor.

13. The method of claim 1, wherein the predetermined amount is user-configurable.

14. The method of claim 1, wherein a notification of the correction is provided.

15. A computer program product embodied on a non-transitory computer readable medium, comprising:
computer code for identifying an electronic mail message; and
computer code for correcting at least one of a date and a time associated with the electronic mail message;
wherein the computer program product is operable such that at least one of a current date and a current time is compared with the at least one of the date and the time associated with the electronic mail message;
wherein the computer program product is operable such that the correction of the at least one of the date and the time associated with the electronic mail message is performed based on the comparison;
wherein the computer program product is operable such that the correction is performed if the at least one of the current date and the current time differs from the at least one of the date and the time associated with the electronic mail message a predetermined amount, where the correction includes changing the at least one of the date and the time associated with the electronic mail message to the at least one of the current date and the current time.

16. A system, comprising:
a mail server for communicating an electronic mail message;
wherein at least one of a date and a time associated with the electronic mail message is corrected;
wherein the system is operable such that at least one of a current date and a current time is compared with the at least one of the date and the time associated with the electronic mail message;
wherein the system is operable such that the correction of the at least one of the date and the time associated with the electronic mail message is performed based on the comparison;
wherein the system is operable such that the correction is performed if the at least one of the current date and the current time differs from the at least one of the date and the time associated with the electronic mail message a predetermined amount, where the correction includes changing the at least one of the date and the time associated with the electronic mail message to the at least one of the current date and the current time.

17. The method of claim 14, wherein the notification is provided before sending the electronic mail message to a client.

18. The method of claim 14, wherein the notification is provided in conjunction with sending the electronic mail message to a client.

19. The method of claim 14, wherein the notification is provided in the form of a separate electronic mail message.

20. The method of claim 1, wherein the changing includes replacing the at least one of the date and the time associated with the electronic mail message with the at least one of the current date and the current time.

* * * * *